United States Patent
Gammel et al.

(10) Patent No.: US 9,003,198 B2
(45) Date of Patent: Apr. 7, 2015

(54) METHOD AND APPARATUS FOR DATA PROCESSING

(71) Applicant: Infineon Technologies AG, Neubiberg (DE)

(72) Inventors: Berndt Gammel, Markt-Schwaben (DE); Stefan Mangard, Munich (DE)

(73) Assignee: Infineon Technologies AG, Neubiberg (DE)

( * ) Notice: Subject to any disclaimer, the term of this patent is extended or adjusted under 35 U.S.C. 154(b) by 134 days.

(21) Appl. No.: 13/899,655

(22) Filed: May 22, 2013

(65) Prior Publication Data

US 2013/0318327 A1  Nov. 28, 2013

(30) Foreign Application Priority Data

May 22, 2012  (DE) .......................... 10 2012 010 102

(51) Int. Cl.
*G06F 9/30* (2006.01)
*G06F 11/07* (2006.01)

(52) U.S. Cl.
CPC .............. *G06F 9/30* (2013.01); *G06F 9/30076* (2013.01); *G06F 9/30145* (2013.01); *G06F 11/0763* (2013.01)

(58) Field of Classification Search
CPC ... G06F 9/30; G06F 11/0763; G06F 9/30145; G06F 9/30076
USPC .......... 713/176, 187, 168, 320, 340; 726/2, 4, 726/24
See application file for complete search history.

(56) References Cited

U.S. PATENT DOCUMENTS

| | | | | |
|---|---|---|---|---|
| 2002/0059567 A1* | 5/2002 | Minamide et al. | ............ | 717/151 |
| 2005/0028036 A1* | 2/2005 | Shibata | ............................ | 714/38 |
| 2006/0156005 A1* | 7/2006 | Fischer et al. | ................ | 713/176 |
| 2013/0055033 A1* | 2/2013 | Frazier et al. | ................... | 714/45 |
| 2013/0198498 A1* | 8/2013 | Koju et al. | .................... | 712/234 |

FOREIGN PATENT DOCUMENTS

| | | |
|---|---|---|
| DE | 19834486 A1 | 2/2000 |
| EP | 0977160 B1 | 1/2006 |
| JP | 2000112749 A | 4/2000 |

OTHER PUBLICATIONS

English abstract of DE19834486A1; Feb. 3, 2000.
Masood Namjoo, Techniques for concurrent testing of VLSI processor operation, IEEE Test Conference, 1982, pp. 461-468.

(Continued)

*Primary Examiner* — Arvin Eskandarnia (57) ABSTRACT

A method for processing an operating sequence of instructions of a program in a processor, wherein each instruction is represented by an assigned instruction code which comprises one execution step to be processed by the processor or a plurality of execution steps to be processed successively by the processor, includes determining an actual signature value assigned to a current execution step of the execution steps of the instruction code representing the instruction of the operating sequence; determining, in a manner dependent on an address value, a desired signature value assigned to the current execution step; and if the actual signature value does not correspond to the desired signature value, omitting at least one execution step directly available for execution and/or an execution step indirectly available for execution.

29 Claims, 6 Drawing Sheets

(56) References Cited

OTHER PUBLICATIONS

Kent Wilken and John Paul Shen, Continuous Signature Monitoring: Efficient Concurrent-Detection of Processor Control Errors, Test Conference, 1988. Proceedings. New Frontiers in Testing, International, Sep. 12-14, 1988, pp. 914-925.

Kent Wilken and John Paul Shen, Continuous Signature Monitoring: Low-Cost Concurrent Detection of Processor Control Errors, IEEE Transactions on Computer-Aided Design, Jun. 1990, pp. 629-641, vol. 9, No. 6.

English abstract of EP0977160B1; Jan. 25, 2006.

Nahmsuk Oh, Philip P. Shirvani and Edward J. McCluskey, Error Detection by Duplicated Instructions in Super-Scalar Processors, IEEE Transactions on Reliability, Mar. 2002, pp. 63-75, vol. 51, No. 1.

Michael A. Schuette and John Paul Shen, Processor Control Flow Monitoring Using Signatured Instruction Streams, IEEE Transactions on Computers, Mar. 1987, pp. 264-276, vol. C-36, No. 3.

George A. Reis, Jonathan Chang, Neil Vachharajani, Ram Rangan, David I. August and Shubhendu S. Mukherjee, Software-Controlled Fault Tolerance, ACM Transactions on Architecture and Code Optimization, Dec. 2005, pp. 366-396, vol. 2, No. 4.

George A. Reis, Jonathan Chang and David I. August, Automatic Instruction-Level Software-only Recovery, IEEE Computer Society, Jan.-Feb. 2007, pp. 36-47.

Nahmsuk Oh, Philip P. Shirvani and Edward J. Mccluskey, Control-Flow Checking by Software Signatures, IEEE Transactions on Reliability, Mar. 2002, pp. 111-122, vol. 51, No. 2.

David Jun Lu, Watchdog Processors and Structural Integrity Checking, IEEE Transactions on Computers, Jul. 1982, pp. 681-685, vol. C-31, No. 7.

Joakim Ohlsson and Marcus Rimén, Implicit Signature Checking, Fault-Tolerant Computing,1995. FTCS-25. Digest of Papers., Twenty-Fifth International Symposium on, Jun. 27-30, 1995, pp. 218-227.

English abstract of JP2000112749A; Apr. 21, 2000.

George A. Reis, Jonathan Chang, Neil Vachharajani, Ram Rangan and David I. August, SWIFT: Software Implemented Fault Tolerance, Code Generation and Optimization, 2005. CGO 2005. International Symposium on, Mar. 20-23, 2005, 12 pages.

* cited by examiner

| Address | 16 bits | 15 bits | 1 bit |
|---|---|---|---|
| $VA_{ISSI}$ | issi | SIG | t |
| $VA_1$ | $i_1$ | $ARG_1$ | |
| $VA_2$ | $i_2$ | $ARG_2$ | |
| $VA_3$ | $i_3$ | $ARG_3$ | |

METHOD AND APPARATUS FOR DATA PROCESSING

RELATED APPLICATIONS

The present application claims priority from German application No.: 10 2012 010 102.3 filed on May 22, 2012.

TECHNICAL FIELD

Various embodiments relate to a method for processing data which includes protection against erroneous execution, a first computer program for carrying out the first method, a method for providing an instruction code, a compiler product for creating a computer program, and furthermore an electrical circuit designed for processing data with application of protection against erroneous execution.

BACKGROUND

DE 198 34 486 A1 describes a method for the protected execution of instructions, wherein, at predefined locations of a sequence of a program, the content of a signature register is compared with a predefined value contained in an instruction of the program.

Namjoo ("Techniques for concurrent testing of VLSI Processor operation", IEEE Test Conference, 1982, 461-468) discloses a method for detecting errors in the sequence of a program processed by a processor, wherein a path signature is analyzed with regard to a change in the sequence or the type of operation steps of the processor.

SUMMARY

Various embodiments improve security against an active attack on a processor.

Various embodiments are based on the concept of supplementing a method which, when carried out, fulfills a predefined function by at least one additional step which indicates if the method has been carried out in an unforeseen manner. In this case, the additional step possibly does not itself contribute to fulfilling the function of the method. In the case of an implementation of the method as a computer program in a computer, by way of example, a register is updated with each step of the method and, when the additional step is carried out, the current value of the register is compared with a value expected in the case where the method is carried out as foreseen.

Various embodiments are explained in various regards below. Features of different embodiments can be combined with one another, provided that nothing to the contrary is evident from the description.

In one aspect, various embodiments include a method for processing an operating sequence of instructions of a program in a processor. Each instruction is represented by an assigned instruction code (also called operation code or opcode for short). By way of example, the instruction is expressed by an assembly language or machine language and is represented by byte code. In one embodiment, the instruction is assigned an operation which is carried out during the processing of the operating sequence. In one embodiment, the operation is assigned a plurality of instructions which are executed for the purpose of carrying out the operation. In one embodiment, the instruction code includes one or a plurality of execution steps to be processed successively by the processor. The method includes determining an actual signature value. The actual signature value is assigned to a current execution step of the execution steps of the instruction code representing the instruction of the operating sequence. The current execution step defines a current instruction as an instruction whose instruction code includes the current execution step. The method furthermore includes determining, in a manner dependent on an address value, a desired signature value. The desired signature value is assigned to the current execution step.

Determining the desired signature value in a manner dependent on the address value means that the address value influences the desired signature value. By way of example, the desired signature value corresponds to the address value. By way of example, the desired signature value corresponds to a binary number whose digits correspond in each case to a selected location of the address. Determining the desired signature value can additionally take account of one or a plurality of other dependencies.

In one embodiment, the desired signature value is determined by a mapping of the address value by means of a desired signature function. In this embodiment, the method applies for example the desired signature function to the address assigned to the current instruction in order to determine a value of a desired signature assigned to the current instruction. Consequently, that address at which code representing the instruction is stored determines the value of the desired signature.

One embodiment of the method includes omitting at least one execution step directly available for execution and/or an execution step indirectly available for execution if the actual signature value does not correspond to the desired signature value. If the execution step directly available for execution is executed, then this takes place after the current execution step, without a further execution step additionally being executed in between. If the execution step indirectly available for execution is executed, then this takes place after the current execution step at the earliest after the execution step directly available for execution has been executed.

One embodiment of the method includes carrying out an execution step directly available for execution provided that a predefined condition is met. The predefined condition consists, for instance, in a correspondence of the actual signature value to the desired signature value assigned to the current execution step.

One embodiment of the method includes comparing the actual signature value with the desired signature value in order to ascertain whether the predefined condition is met. In one embodiment, the comparison takes place implicitly by virtue of the fact that, for instance, an access to a memory register in accordance with the actual signature value, in particular directly, leads to a method interruption and/or a termination of the method if the predefined condition is not met.

In one embodiment of the method, the current execution step itself forms the execution step available for execution. In another embodiment, an execution step which directly succeeds the current execution step forms the execution step available for execution. In one embodiment, the execution steps of one or more instructions are arranged for example in a so-called phase pipeline as execution steps to be processed successively and are thus as it were lined up. If, in one embodiment, the current execution step is situated in the phase pipeline, then for instance an execution step which directly succeeds the current execution step in the phase pipeline forms the execution step available for execution. In one embodiment, an execution step determined in a manner proceeding from the current execution step in accordance with a predefined rule forms the execution step available for execution.

In one embodiment, the actual signature value is determined in a manner dependent on a signature change value. The signature change value can be fixedly predefined. Determining the actual signature value in a manner dependent on the signature change value means that the signature change value influences the actual signature value.

One embodiment of the method according to the various embodiments includes, if the actual signature value does not correspond to the desired signature value, setting a signal according to which the processing of the operating sequence is to be interrupted or is to be terminated. In one embodiment of various embodiments, the signal has the effect that the processing of the operating sequence is interrupted as soon as is possible without putting the processor into a non-defined state. In particular, in one embodiment of various embodiments, the signal entails a termination of the processing of the operating sequence. By way of example, the program sequence contains, directly after the execution of the current instruction, a jump to a subroutine which causes the processor to be reset to a predefined initial state. One embodiment includes, if the predefined condition is met, setting a signal according to which the processing of the operating sequence is to be continued.

In one embodiment of the method according to the various embodiments, only one actual signature value is determined for each instruction, independently of the number of execution steps of the instruction code representing the instruction. In one embodiment, only one comparison of actual signature value with desired signature value is performed for the instruction independently of the number of the execution steps of the instruction code representing the instruction.

In one embodiment, the method has at least one signature execution step. Actual signature value and desired signature value are only compared with one another if the current execution step is qualified as a signature execution step. One embodiment includes checking, in particular checking beforehand, whether the current execution step is qualified as a signature execution step.

In one embodiment, the method according to various embodiments includes storing the instruction code assigned to the instructions of the operating sequence in a memory, in particular in a program memory. In one embodiment, instruction code representing the current instruction has been and/or is written to a memory at an address having the address value. In particular, in one embodiment, instruction code representing the current instruction has been and/or is stored in a memory at an address having the address value. In one embodiment of the method according to various embodiments, a physical memory is addressed directly. The address of the physical memory identifies the location in the physical memory at which the current execution step or the instruction code of the current instruction has been and/or is stored. In one embodiment of the method according to various embodiments, a logical memory (also called "virtual memory") is used. By way of example, an assignment function maps an address of the logical memory onto an address of the physical memory.

In one embodiment of the method according to various embodiments, the actual signature value is determined during the execution of an instruction. In one embodiment, the code representing the instruction determines the actual signature value. By way of example, the method applies an actual signature function to the current instruction in order to determine a value of an instruction signature assigned to the current instruction. In one embodiment, control signals initiated by the instruction determine the value of the actual signature value.

In one embodiment, the actual signature value is determined by a mapping by means of an actual signature function. In one embodiment, the actual signature function takes account of an actual signature value that has already been determined. By way of example, the actual signature value is calculated incrementally and/or recursively using an operating sequence signature function. An actual signature value that has already been calculated, in particular an actual signature value calculated last, has an influence for example on a calculation of the actual signature value.

In one embodiment, the operating sequence has a sub-operating sequence. In this embodiment, the method includes one or more of the following steps:
  reading the actual signature value from an actual signature register;
  writing the actual signature value to a first signature value memory address;
  processing the sub-operating sequence; and
  reading the value at the first signature value memory address and writing the read-out value to the actual signature register.

In this embodiment, after the processing of the sub-operating sequence, the actual signature register has an actual signature value that is dependent on the processing of the sub-operating sequence.

In one embodiment, the sub-operating sequence is assigned a sub-operating sequence signature change value. The actual signature value is determined in a manner dependent on the sub-operating sequence signature change value. In one embodiment, the actual signature value assigned to a first instruction of the sub-operating sequence is dependent only on the sub-operating sequence signature change value. In this embodiment, after the processing of the sub-operating sequence, the actual signature value is independent of other sections of the operating sequence.

In one embodiment, the actual signature value assigned to a first instruction of the sub-operating sequence is dependent both on the sub-operating sequence signature change value and on the actual signature value assigned to the instruction executed last. In this embodiment, the sub-operating sequence signature change value can be chosen such that the actual signature value of a calling operating sequence can be calculated on the basis of an address of the sub-operating sequence.

One embodiment of the method according to various embodiments includes the following steps:
  changing a mode signal which signals a first sequence mode in such a way that the mode signal signals a second sequence mode;
  processing the sub-operating sequence; and
  changing the mode signal which signals the second sequence mode in such a way that the mode signal signals the first sequence mode.

In particular, one variant of this embodiment includes the additional steps of:
  writing the actual signature value to a second signature value memory address if the mode signal which signals the first sequence mode is changed in such a way that the mode signal signals the second sequence mode; and
  reading the value at the second signature value memory address and writing the read-out value to the actual signature register if the mode signal which signals the second sequence mode is changed in such a way that the mode signal signals the first sequence mode.

In one embodiment, an actual signature value is determined either only if the first sequence mode is signaled, or only if the second sequence mode is signaled. In this embodiment, a program sequence can change back and forth between a protected state and an unprotected state, for example from the first sequence mode to the second sequence mode and back again to the first sequence mode.

In one embodiment, an actual signature value is determined either only if the first sequence mode is signaled, or only if the second sequence mode is signaled. In this embodiment, a change in the program sequence from the protected state to the unprotected state can be ascertained if the actual signature value is not currently determined.

One embodiment of the method according to various embodiments includes writing a path signal value, representing a predefined path, into a signature field of the instruction code. One embodiment includes writing a signature change value, representing a signature change, into the signature field.

One embodiment includes writing the instruction code representing the current instruction or an instruction directly preceding the current instruction to an address corresponding to the predefined address value.

One embodiment of the method according to various embodiments includes a signature operation ISSA, in which an operation "activate updating of the actual signature" (Instruction Stream Signature Activate) is carried out. After the signature operation ISSA has been carried out, the actual signature value is constantly updated in accordance with the method according to various embodiments. One embodiment uses a register as a mode register and sets the value thereof in such a way that the value represents the ongoing signature updating.

One embodiment of the method according to various embodiments includes a signature operation ISSW, in which an operation "set a signature change value" (Instruction Stream Signature Write) is carried out. In this operation, the actual signature register is set to a signature change value. In one embodiment, the signature change value is stored in a signature field of the instruction code of a signature instruction assigned to the signature operation ISSW. The actual signature value of such instructions which are executed after this signature instruction has been executed is independent of the actual signature value of those instructions which were executed before this signature instruction is executed.

One embodiment of the method according to various embodiments includes a signature operation ISSI, in which an operation "start of a protected operating sequence" (Instruction Stream Signature Initialisation) is carried out. The signature operation ISSI combines the signature operation ISSA with the signature operation ISSW.

One embodiment of the method according to various embodiments includes a signature operation ISSC, in which an operation "signature check" (Instruction Stream Signature Check) is carried out. The operation "signature check" is a comparison operation that compares desired signature value and actual signature value with one another.

One embodiment of the method according to various embodiments includes a signature operation ISSD, in which an operation "deactivate updating of the actual signature" (Instruction Stream Signature Deactivate) is carried out. After the signature operation ISSD has been executed, the actual signature value assigned to subsequent execution steps is no longer determined. One embodiment uses a register as a mode register and sets the mode register to a value representing a deactivation of the signature check.

One embodiment of the method according to various embodiments includes a signature operation ISSE, in which an operation "end of a protected sub-operating sequence" (Instruction Stream Signature Exit) is carried out. The operation "end of a protected sub-operating sequence" combines the signature operation ISSC with the signature operation ISSD.

One embodiment of the method according to various embodiments includes a signature operation ISSU, in which an operation "update actual signature with predefined value" (Instruction Stream Signature Update) is carried out. When this operation is carried out, the actual signature register is updated with a signature change value. In contrast to the signature operation ISSW, this update does not take place in absolute terms, but rather in relative terms. After the signature operation ISSU has been carried out, the actual signature value is therefore dependent both on the actual signature value determined last before carrying out the signature operation ISSU, and on the signature change value. In one embodiment, the signature change value is stored in a signature field of the instruction code representing the signature instruction assigned to the signature operation ISSU.

One embodiment of the method according to various embodiments includes a signature operation ISSCU, in which an operation "signature check and update" (Instruction Stream Signature Check and Update) is carried out. The operation "signature check and update" combines the signature operation ISSC with the signature operation ISSU.

One embodiment of the method according to various embodiments includes a signature operation ISSUC, in which an operation "update actual signature conditionally with predefined value" (Instruction Stream Signature Update Conditional) is carried out. In this embodiment, a first execution path is predefined, wherein the sequence of the operating sequence can deviate from the predefinition at a branch in order to traverse a second execution path. By way of example, the predefinition is such that the predefined first execution path at the branch manages without a jump to a partial operating sequence, while the second path runs through the partial operating sequence with deviation from the predefinition starting from the branch. Depending on the sequence of the operating sequence at the branch, the actual signature register is updated, if the sequence corresponds to the predefinition, in a manner taking account of the signature value assigned to the jump instruction and, if the sequence does not correspond to the predefinition, in a manner taking account of the signature value assigned to the jump instruction and of the signature change value assigned to the partial operating sequence. If the signature change value was suitably predefined, then the actual signature value, if the sequence of the operating sequence does not correspond to the predefined sequence, after the processing of the partial operating sequence, is identical to the actual signature value for the case where the sequence corresponds to the predefinition.

One embodiment of the method according to various embodiments includes a signature operation ISSWCA, in which an operation "initialize actual signature register with current address" (Instruction Stream Signature Write Current Address) is carried out. When the operation "initialize actual signature with current address" is carried out, the actual signature register is set to a value which is dependent on the address of the instruction code/codes representing the signature instruction assigned to the signature operation ISSWCA. In one embodiment, by way of example, the actual signature value is set to a value which corresponds to the desired signature value for the instruction code representing the signature instruction assigned to the signature operation ISSWCA.

One embodiment of the method according to various embodiments includes a signature operation ISSWA, in which an operation "initialize actual signature register with address" (Instruction Stream Signature Write Address) is carried out. When the operation "initialize actual signature register with address" is carried out, the actual signature register is set to a value which is dependent on an address. In one embodiment, by way of example, the actual signature register is set to a value which corresponds to the desired signature value for a jump destination of the current instruction.

In one embodiment, the method has at least one signature execution step. Actual signature value and desired signature value are only compared with one another if the current execution step is qualified as a signature execution step. Any instruction which includes a signature execution step is designated as a signature instruction.

In one embodiment of the method according to various embodiments, an indirect jump instruction includes at least one signature execution step. In particular, in one embodiment, every indirect jump instruction includes a signature execution step.

In one embodiment of the method according to various embodiments, return instructions from sub-operating sequences include at least one signature execution step.

In one embodiment of the method according to various embodiments, there are explicit instructions for carrying out one or a plurality of signature operations.

In one regard, various embodiments include a computer program designed for carrying out the method according to various embodiment. In one embodiment, the computer program is designed for carrying out the method according to various embodiments in a distributed manner in a plurality of processors.

In one regard, various embodiments include a method (compiling method) for providing an instruction code representing one or a plurality of instructions of an operating sequence of a computer program. Instruction code representing a respective instruction includes at least one execution step to be executed by a processor. In one embodiment, the instruction code representing a respective instruction includes a plurality of execution steps to be executed successively by the processor.

The compiling method according to various embodiments is provided for being carried out in at least one processor (compiling processor). The compiling method includes converting, in particular translating, a program text (source code, source text, source program) representing the operating sequence into the instruction code representing the instructions of the operating sequence. The term compiling should be understood to mean one or more of the following measures: mapping and/or translating the program text or sections of the program text from the computer high-level language into an object language, in particular a machine language, providing instruction code representing instructions of the translated program text, linking or combining sections of the program text with one another and/or with some other computer program section. The program text is written for example in a computer high-level language such as Java or C++.

The compiling method according to various embodiments furthermore includes defining an inception execution step assigned to the operating sequence in the instruction code. In one embodiment, the compiling method includes allocating a signature change value to the inception execution step.

In one embodiment, the step of inserting data fields and/or program instructions related to one of the steps of the method according to various embodiments is performed during compiling of a computer program designed for processing in accordance with the method according to various embodiments.

In one embodiment, the compiling method implicitly defines the inception execution step for instance by defining one of the instructions of the operating sequence as an inception instruction, after which, using a predefined rule, one of the execution steps of the instruction code representing the instruction forms the inception execution step. By way of example, the predefined rule stipulates that the first execution step of the instruction code forms the inception execution step, or the predefined rule stipulates, for instance, that the last execution step of the instruction code forms the inception execution step.

In one regard, various embodiments include a compiler product, designed for creating a computer program according to various embodiments, by compiling a program text representing the operating sequence in order to provide the instruction code representing the operating sequence. One embodiment of the compiler product is designed to define an inception execution step assigned to the operating sequence and to allocate a signature change value to the inception execution step. One embodiment of the compiler product according to various embodiments is designed to determine the signature change value in a manner dependent on the predefined desired signature value. In one embodiment of various embodiments the compiler product uses a Reed-Solomon algorithm in order to determine the signature change value. One embodiment of the compiler product according to various embodiments is designed to determine the signature change value by tracing a program sequence path. In this case, the program sequence path begins for instance with the inception execution step and ends for instance with the instruction code of the execution step which is written to the memory at the address to which the signature instruction or the signature execution step is assigned.

In one embodiment of the compiler product, the signature change value is determined proceeding from the address to which the signature instruction or signature execution step is assigned, with inverse application of a mapping function which is applied during the sequence of the program in accordance with a predefined rule.

In one regard, various embodiments include an electrical circuit having an actual signature register designed for receiving an actual signature value. In one embodiment, the electrical circuit is embodied in an integrated manner at least in sections.

One embodiment of the electrical circuit according to various embodiments has a desired signature register designed for receiving a desired signature value.

In one embodiment, the electrical circuit has a comparison device, which is designed to compare a value from the actual signature register with a desired signature value and to set an identical signal, if the value from the actual signature register corresponds to the desired signature value, and to set a non-identical signal, if the value from the actual signature register does not correspond to the desired signature value.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawings that show, by way of illustration, specific details and embodiments in which the disclosed embodiments may be practiced.

Figure 1:
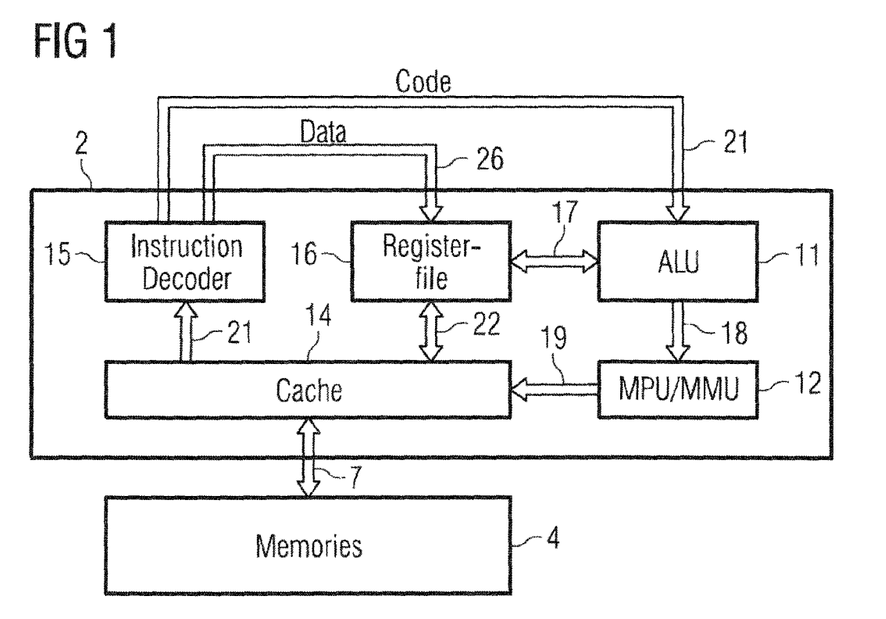
FIG. 1 shows a schematic illustration of an exemplary computer designed for carrying out an exemplary embodiment of the method according to the disclosed embodiments.

The exemplary embodiment of the device according to various embodiments has a computer. The computer includes a processor 2 and memories 4. The processor 2 includes a cache memory 14, an instruction decoder 15, which is designed for decoding instruction code, a register file 16, an arithmetic logic unit (ALU) 11 and a microprocessor and memory management unit (MPU/MMU) 12.

The cache memory 14 is connected by means of a memory bus 7 to the memories 4 for a write and read access to the memories 4. The cache memory 14 is firstly connected to the instruction decoder 15 by means of an instruction bus 21 in such a way that instruction code stored in the cache memory 14 can be read out by the instruction decoder 15; secondly, the cache memory 14 is connected by means of a register bus 22 to the register file 16 for a write and read access to the cache memory 14.

The arithmetic logic unit (ALU) 11 is connected to the register file 16 by means of a first ALU bus 17 for a write and read access. Furthermore, the arithmetic logic unit (ALU) 11 is connected to the microprocessor and memory management unit 12 by means of a second ALU bus 18 for a write access on the part of the arithmetic logic unit (ALU) 11.

The microprocessor and memory management unit 12, for its part, is connected by means of a write bus 19 to the cache memory 14 for a write access on the part of the microprocessor and memory management unit 12.

The instruction decoder 15 is connected to the register file 16 by means of a control bus 26 in such a way that control signals from the instruction decoder 15 can be received at the register file 16. The instruction decoder 15 is connected to the arithmetic logic unit 11 by means of the control bus 21 in such a way that control signals of the instruction decoder 15 can be received by the arithmetic logic unit.

The instruction decoder 15 (FIG. 2) includes a conventional decoder 151, a mapping device 152 and a signature device (Code Signature Function) 153 with an actual signature register 154. The instruction decoder 15 furthermore includes a function circuit 156 and also a check device 155, which is connected to the signature register 154 and the function circuit 156.

Figure 2:
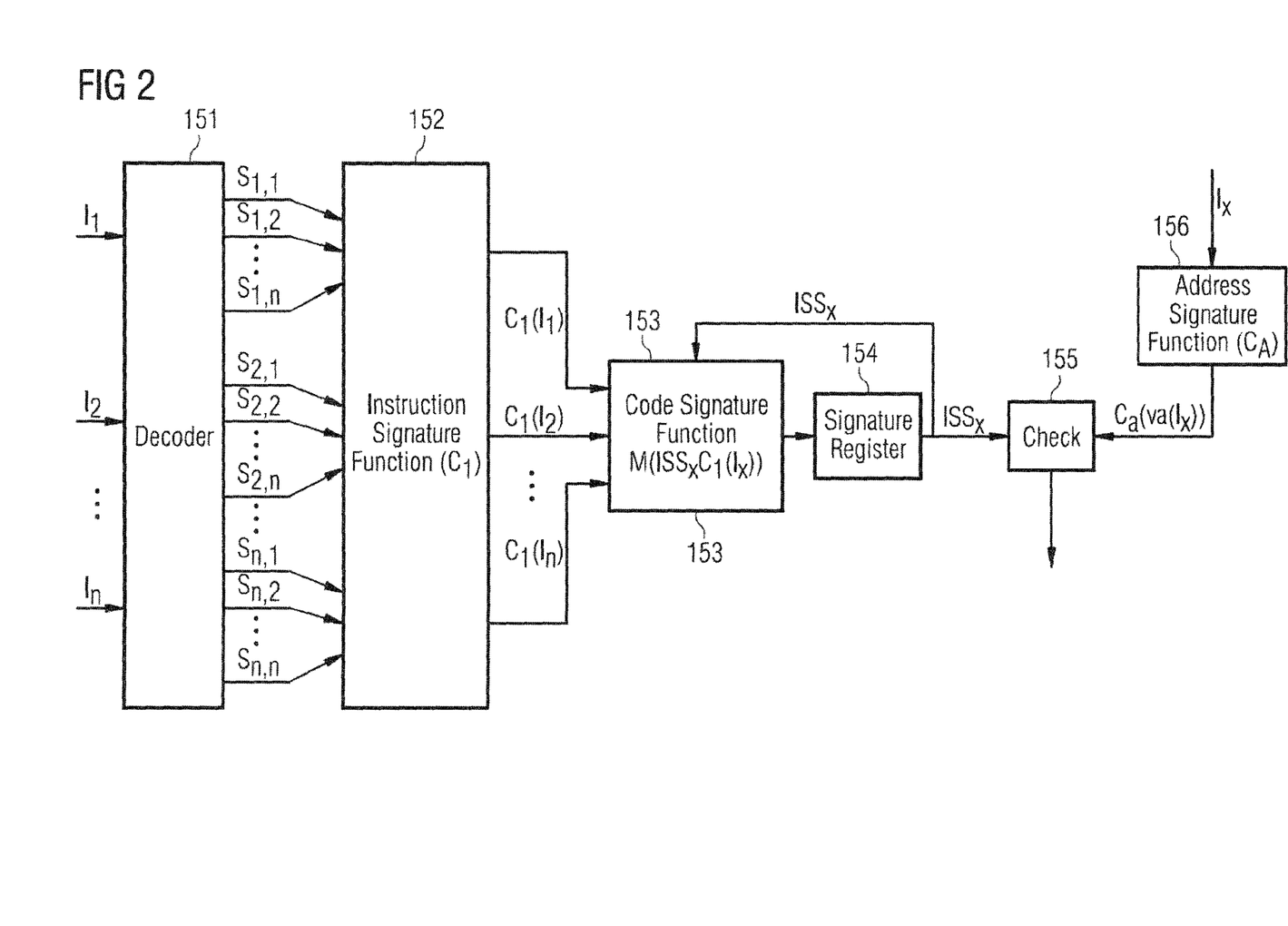
FIG. 2 shows a schematic illustration of a section of the exemplary embodiment in FIG. 1.

The decoder 151 is designed to read out instruction code assigned to instructions $i_1, i_2, \ldots, i_n$ of an operating sequence of a computer program (FIG. 6) from the cache memory (n shall denote the number of instructions of the operating sequence in the exemplary embodiment). The decoder 151 is furthermore designed to determine for each instruction one or, if appropriate, a plurality of control signals $s_{1,1}, s_{1,2}, \ldots, s_{1,m}, s_{2,1}, s_{2,2}, \ldots, s_{2,m'}, \ldots, s_{n,1}, s_{n,2}, \ldots, s_{n,m''}$ (m, m', m'' shall denote the number of control signals comprised by the instruction code which represents the respective instruction of the operating sequence in the exemplary embodiment) and to output said control signal(s) to the mapping device 152. The control signals $s_{1,1}, s_{1,2}, \ldots, s_{1,m}; s_{2,1}, s_{2,2}, \ldots, s_{2,m'}$ can be assigned to one or a plurality of execution steps of the respective instruction $i_1$ or $i_2$.

The mapping device 152 is designed to read in control signals $s_{1,1}, s_{1,2}, \ldots, s_{1,m}, s_{2,1}, s_{2,2}, \ldots, s_{2,m'}, \ldots, s_{n,1}, s_{n,2}, \ldots, s_{n,m''}$ output by the decoder 151 and to map for each instruction $i_1, i_2, \ldots, i_n$ the control signals $s_{1,2}, \ldots, s_{1,m}; s_{2,1}, s_{2,2}, \ldots, s_{2,m'}; \ldots; s_{n,1}, s_{n,2}, \ldots, s_{n,m''}$ of the respective instruction, in accordance with a mapping convention $C_I$ assigned to instructions, onto an instruction signature value $C_I(i_1), C_I(i_2), \ldots, C_I(i_n)$ assigned to the instruction $i_x = i_1, i_2, \ldots, i_n$. In one variant of the exemplary embodiment (not illustrated), the mapping device 152 is designed to map the control signals $s_{1,2}, \ldots, s_{1,m}, s_{2,1}, s_{2,2}, \ldots, s_{2,m'}, \ldots, s_{n,1}, s_{n,2}, \ldots, s_{n,m''}$ assigned to the individual execution steps, in accordance with a mapping convention $C_{I'}$ assigned to execution steps, onto an execution step signature value $C_I(i_{1,1}), C_I(i_{1,2}), \ldots, C_I(i_{n,m''})$ assigned to the respective execution step.

Furthermore, the mapping device 152 is designed to output the respective instruction signature value $C_I(i_1), C_I(i_2), \ldots, C_I(i_n)$ to the signature device 153.

The signature device 153 includes the actual signature register 154 and is designed to determine for each instruction signature value $C_I(i_x)$, using an operating sequence signature function $M(ISS_{x-1}, C_I(i_x))$, an actual signature value $ISS_x$ assigned to the instruction $i_x$ and to write the actual signature value $ISS_x$ to the actual signature register 154. The operating sequence signature function $M(ISS_{x-1}, C_I(i_x))$ takes account of the instruction signature value $C_I(i_x)$ and also an actual signature value $ISS_{x-1}$ determined last, which the operating sequence signature function $M(ISS_{x-1}, C_I(i_x))$ reads out from the actual signature register 154.

The function circuit 156 is designed to determine a desired signature value $C_a(VA_x)$ in accordance with a predefined convention $C_a$.

The check device 155 is designed to compare a value from the signature register 154 (actual signature value) with a value output by the function circuit 156 (desired signature value) and output an alarm signal depending on a comparison result.

First Exemplary Embodiment of the Method According to Various Embodiments

The method in accordance with the first exemplary embodiment is based on an operating sequence of instructions (FIG. 3) of an exemplary embodiment of a computer program according to various embodiments, which is designed to run on the computer of the exemplary embodiment of the apparatus according to various embodiments. The operating sequence is designed for processing in a processor 2 and/or in a plurality of processors of the computer by instructions $i_1, i_2, \ldots, i_6$ of the operating sequence being processed successively ("linearly"). In particular, the operating sequence is protected according to various embodiments against a situation where impermissible interventions in the operating sequence can be accomplished in an unnoticed and/or successful manner.

Figure 3:
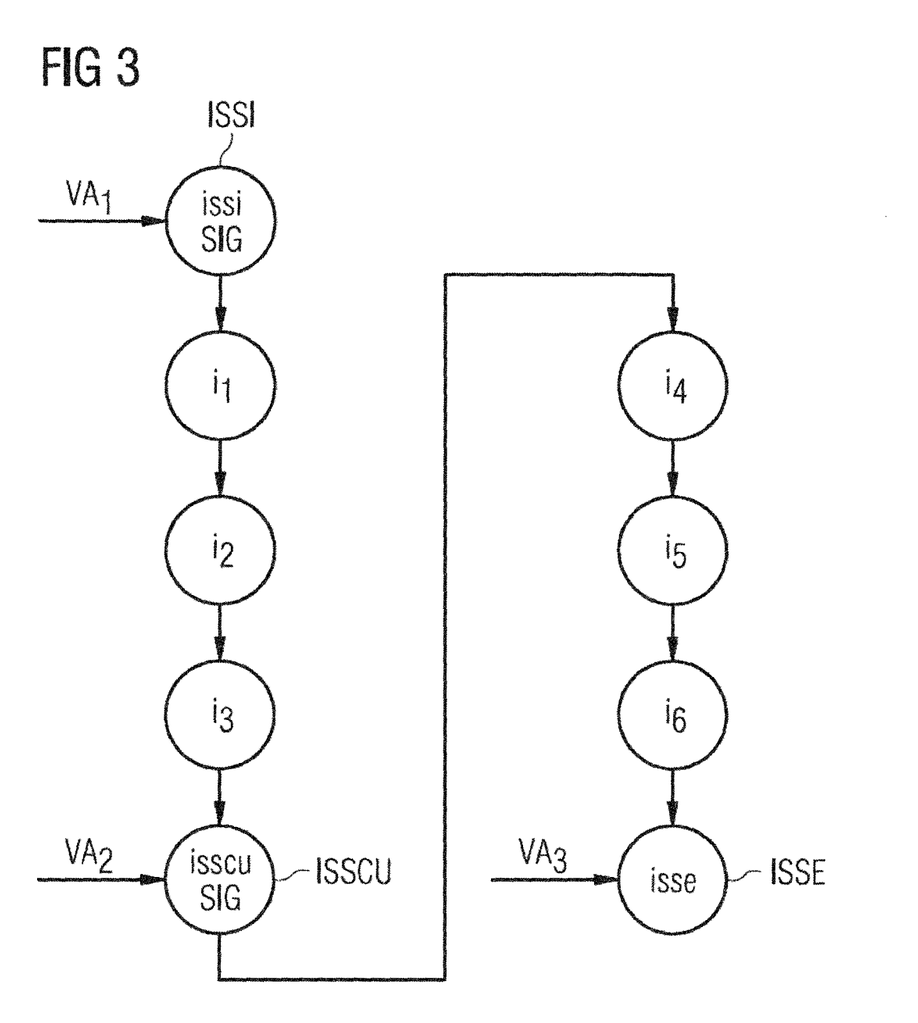
FIG. 3 shows a schematic illustration of a first exemplary embodiment of the method according to the disclosed embodiments.

The instructions are in each case represented by code having 32 bits, of which for example 16 bits include so-called opcode, representing an operation, and a further 16 bits represent an argument of the operation.

Figure 6:
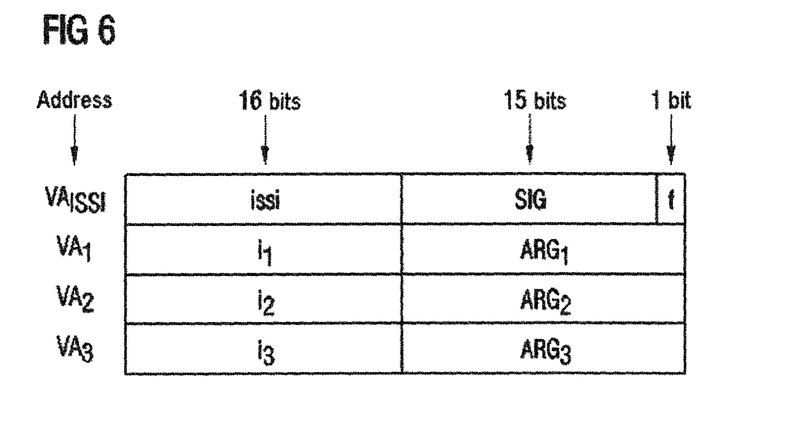
FIG. 6 shows a schematic illustration of a representation of a section of an operating sequence by instruction code.

The operating sequence has a first signature instruction ISSI, which executes a first signature operation "start of a protected operating sequence" (Instruction Stream Signature Initialisation). Furthermore, the first signature instruction ISSI includes an argument SIG, which includes a first signature change value $m_{ISSI}$ and a path signal value f, which is of no significance, however, in the first exemplary embodiment. The first signature change value $m_{ISSI}$ is represented by code having a length of 15 bits and the path signal value f is represented by code having a length of one bit (FIG. 6). The first signature instruction ISSI is stored in the memories 4 at the address $VA_1$.

The operating sequence furthermore has a second signature instruction ISSCU, which executes a second signature operation "signature check and update" (Instruction Stream Signature Check and Update). Furthermore, the second signature instruction ISSCU includes the argument SIG, which includes a second signature change value $m_{ISSCU}$ and the path signal value f. The second signature change value $m_{ISSCU}$ is represented by code having a length of 15 bits. The second signature instruction ISSCU is stored in the memories 4 at the address $VA_2$ for execution after a third instruction $i_3$ of the operating sequence and before a fourth instruction $i_4$ of the operating sequence.

The operating sequence furthermore has a third signature instruction ISSE, which executes a third signature operation "end of a protected operating sequence" (Instruction Stream Signature Exit). In contrast to the first signature instruction ISSI and the second signature instruction ISSCU, the third signature instruction ISSE has no argument SIG. The third signature instruction ISSE is stored in the memories 4 at the address $VA_3$ for execution after a sixth instruction $i_6$ of the operating sequence.

In the first exemplary embodiment, the three signature operations are executed by in each case only one signature instruction ISSI, ISSCU and ISSE, respectively. In one variant of this exemplary embodiment, the signature operations are executed in each case by a sequence of instructions rather than only by one instruction. One example of such a variant is the execution of the signature operations by, for example, different values being successively written to a plurality of registers or read from there.

The sequence of the operating sequence of the first exemplary embodiment is described below.

Firstly, the first signature instruction ISSI executes the first signature operation "start of a protected operating sequence". During this operation, the decoder 151 reads the argument SIG of the first signature instruction ISSI and writes the signature change value $m_{ISSI}$ to the actual signature register 154. One variant of the exemplary embodiment additionally uses a predefined register as a mode register and sets the value thereof in such a way that said value represents the activation and thus a use of the signature check. Afterward, the processor 2 processes the first three instructions $i_1$, $i_2$, $i_3$ of the operating sequence. In the meantime, for each instruction the signature device 153 determines, using the operating sequence signature function $M(ISS_{x-1}, C_f(i_x))$, a respective actual signature value $ISS_1$, $ISS_2$ and $ISS_3$ assigned to the instruction $i_1$, $i_2$ and $i_3$, respectively. The operating sequence signature function $M(ISS_{x-1}, C_f(i_x))$ takes account here of in each case the instruction signature value $C_f(i_1)$, $C_f(i_2)$ and $C_f(i_3)$ and also the actual signature value $ISS_{ISSI}$, $ISS_1$ and $ISS_2$ respectively determined last.

The second signature instruction ISSCU then executes the second signature operation "signature check and update". The second signature operation compares the actual signature value $ISS_{ISSCU}$ assigned to the signature instruction at the address $VA_2$ with a desired signature value $C_a(VA_2)$ determined on the basis of the address $VA_2$. If actual signature value $ISS_{ISSCU}$ and desired signature value $C_a(VA_2)$ correspond, then the processor 2 processes the operating sequence further. If actual signature value $ISS_{ISSCU}$ and desired signature value $C_a(VA_2)$ do not correspond, by contrast, then an error signal is set. In one variant of the exemplary embodiment, the error signal is stored in a register. In a further variant of the exemplary embodiment, the processor 2 terminates the processing of the operating sequence.

The second signature operation "signature check and update" furthermore updates the actual signature register 154 to an actual signature value $ISS_{VA2}$, taking account both of the actual signature value $ISS_3$ determined last before the execution of the second signature instruction ISSCU and of the signature change value $m_{ISSCU}$.

If the processor 2 continues the processing of the operating sequence, then the processor 2 processes the next three instructions $i_4$, $i_5$, $i_6$ of the operating sequence. In the meantime, for each instruction, the signature device 153 determines, using the operating sequence signature function $M(ISS_{x-1}, C_f(i_x))$, an actual signature value $ISS_4$, $ISS_5$ and $ISS_6$ assigned to the instruction $i_4$, $i_5$ and $i_6$, respectively. The operating sequence signature function $M(ISS_{x-1}, C_f(i_x))$ takes account here of in each case the instruction signature value $C_f(i_4)$, $C_f(i_5)$ and $C_f(i_6)$ and of the actual signature value $ISS_{VA2}$, $ISS_4$ and $ISS_5$ respectively determined last.

The third signature operation "end of a protected operating sequence" compares, by means of the comparison device 155, an actual signature value $ISS_{ISSE}$ assigned to the signature instruction ISSE at the address $VA_3$ and written to the actual signature register 154 with a desired signature value $C_a(VA_3)$ determined by the function circuit 156 on the basis of the address $VA_3$. If actual signature value $ISS_{ISSE}$ and desired signature value $C_a(VA_3)$ correspond, then the processor 2 ends operation in the secure mode as planned. If actual signature value $ISS_{ISSE}$ and desired signature value $C_a(VA_3)$ do not correspond, by contrast, then an error signal is set, which the check device 155 outputs as an alarm signal, for example. In one variant, the signal is stored in a register. In a further variant of the exemplary embodiment, the processor 2 terminates the processing of the operating sequence.

Second Exemplary Embodiment of the Method According to Various Embodiments

The method in accordance with the second exemplary embodiment is based on an operating sequence of instructions $i_1, i_2, \ldots, i_6$ (FIG. 4) of a second exemplary embodiment of a computer program according to various embodiments, which, as in the case of the method of the first exemplary embodiment, is designed to run on the computer of the exemplary embodiment of the apparatus according to various embodiments. The operating sequence $i_1, i_2, \ldots, i_6$ is designed for processing in a processor 2 and/or in a plurality of processors of the computer by instructions $i_1, i_2, \ldots, i_6$ of the operating sequence being processed.

Figure 4:
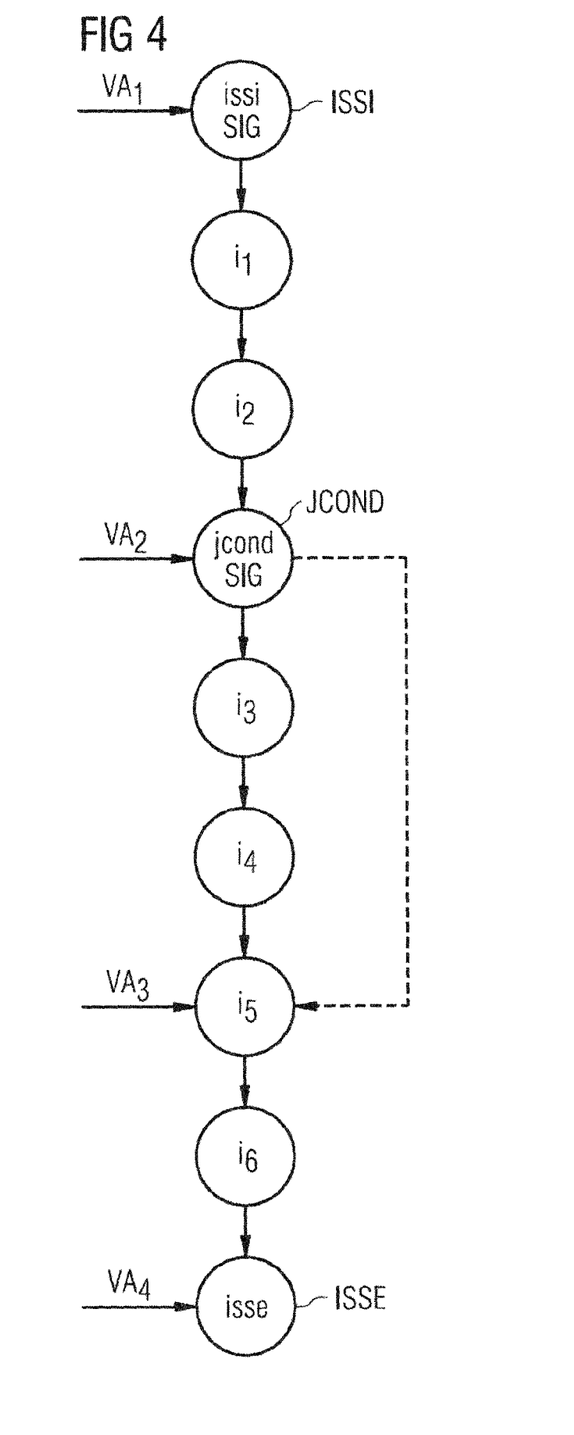
FIG. 4 shows a schematic illustration of a second exemplary embodiment of the method according to the disclosed embodiments.

The computer program of the second exemplary embodiment differs from the computer program of the first exemplary embodiment in a conditional jump instruction JCOND. Owing to the conditional jump instruction JCOND, the computer program includes a first operating sequence having the instructions $i_1, i_2, i_3, i_4, i_5, i_6$ and a second operating sequence having the instructions $i_1$, $i_2$, $i_5$, $i_6$. The fact of whether the second operating sequence is carried out depends on the conditional jump instruction and thus on a condition of the conditional jump instruction being met.

Specifically, the computer program of the second exemplary embodiment has a first signature instruction ISSI, which corresponds identically to the first signature instruction ISSI of the first exemplary embodiment and which is provided for execution before a first instruction $i_1$.

The computer program has a second signature instruction JCOND, which executes a second signature operation "update actual signature conditionally with predefined value" (Instruction Stream Signature Update Conditional, ISSUC for short). Furthermore, the second signature instruction JCOND includes an argument SIG, which includes a first signature change value $m_{jcond}$ and a path signal value f. The second signature change value $m_{jcond}$ is represented by code having a length of 15 bits and the path signal value f is represented by code having a length of 1 bit. The path signal value f signals whether the signature change value $m_{jcond}$ is taken into account in the case of the processing of the first operating sequence or in the case of the processing of the second operating sequence. The second signature instruction JCOND is stored in the memories 4 at the address $VA_2$ for execution after a second instruction $i_2$ in the first operating sequence and before a third instruction $i_3$ of the first operating sequence and before a third instruction $i_5$ of the second operating sequence.

The computer program has an instruction $i_5$ arranged both as a fifth instruction in the first operating sequence and as a third instruction in the second operating sequence. The instruction $i_5$ is provided for execution directly after a fourth instruction $i_4$ in the first operating sequence. Furthermore, the fifth instruction $i_5$ is provided in the second operating sequence for execution directly after the second signature instruction JCOND.

The computer program furthermore has a third signature instruction ISSE, which executes a third signature operation "end of a protected operating sequence" (Instruction Stream Signature Exit). In contrast to the first signature instruction ISSI and the second signature instruction JCOND, the third signature instruction ISSE has no argument SIG. The third signature instruction ISSE is stored in the memories 4 at the address $VA_4$ for execution after a sixth instruction $i_6$ of the first operating sequence or a fourth instruction $i_6$ of the second operating sequence.

The sequence of the first and second operating sequences of the second exemplary embodiment is described below.

Firstly, as in the first exemplary embodiment, the first signature instruction ISSI executes the first signature operation "start of a protected operating sequence". The processor 2 subsequently processes the first two instructions $i_1$, $i_2$ of the operating sequence. In the meantime, for each instruction the signature device 153 determines, using the operating sequence signature function $M(ISS_{x-1}, C_f(i_x))$, a respective actual signature value $ISS_1$ and $ISS_2$ assigned to the instruction $i_1$ and $i_2$, respectively. The operating sequence signature function $M(ISS_{x-1}, C_f(i_x))$ takes account here of in each case the instruction signature value $C_f(i_1)$ and $C_f(i_2)$ and of the actual signature value $ISS_{ISSI}$ and $ISS_1$ respectively determined last.

The second signature instruction JCOND then executes the second signature operation "update actual signature conditionally with predefined value". The second signature operation includes reading the signature change value $m_{jcond}$ and the path signal value f. In the present second exemplary embodiment, the path signal value f shall be equal to zero. Furthermore, the second signature operation includes reading a jump signal (not designated more specifically here) that governs whether the first operating sequence or the second operating sequence is subsequently intended to be processed. In the present second exemplary embodiment, the jump signal shall be equal to zero if no jump is intended to be executed, with the result that the first operating sequence is processed, and the jump signal shall be equal to 1 if a jump is intended to be executed, with the result that the second operating sequence is processed.

In the case of the processing of the first operating sequence, the actual signature register is updated, with the use of the operating sequence signature function $M(ISS_2, C_f(jcond))$, to an actual signature value $ISS_{VA2}$ taking account of the instruction signature value $C_f(jcond)$ of the second signature instruction JCOND.

The processor 2 subsequently processes the instructions $i_3$, $i_4$, $i_5$ and $i_6$ of the first operating sequence. In the meantime, for each instruction the signature device 153 determines, using the operating sequence signature function $M(ISS_{x-1}, C_f(i_x))$, an actual signature value $ISS_3$, $ISS_4$, $ISS_5$ and $ISS_6$ assigned to the instruction $i_3$, $i_4$, $i_5$ and $i_6$, respectively. The operating sequence signature function $M(ISS_{x-1}, C_f(i_x))$ takes account here of in each case the instruction signature value $C_f(i_3)$, $C_f(i_4)$, $C_f(i_5)$ and $C_f(i_6)$ and of the actual signature value $ISS_{VA2}$, $ISS_3$, $ISS_4$ and $ISS_5$ respectively determined last.

In the case of the processing of the second operating sequence, when the second signature instruction JCOND is executed, the actual signature register 154 is updated to an actual signature value $ISS_{VA2}$. As in the case where the first operating sequence is processed, the update is effected taking account of the actual signature value $ISS_2$ determined last. In addition, in the case of the processing of the second operating sequence, the second signature change value $m_{jcond}$ is also taken into account, however, during the update. Directly afterward, the processor 2 processes the instructions $i_5$ and $i_6$ of the second operating sequence. In the meantime, for each instruction $i_5$, $i_6$, the signature device 153 determines, using the operating sequence signature function $M(ISS_{x-1}, C_f(i_x))$, an actual signature value $ISS_5$ and $ISS_6$ assigned to the instruction $i_5$ and $i_6$, respectively. The operating sequence signature function $M(ISS_{x-1}, C_f(i_x))$ takes account here of in each case the instruction signature value $C_f(i_5)$ and $C_f(i_6)$ and the actual signature value $ISS_{VA2}$ and $ISS_5$ respectively determined last.

In the case of the first operating sequence, as in the case of the second operating sequence, the third signature operation "end of a protected operating sequence" compares the actual signature value $ISS_{ISSE}$ assigned to the signature instruction at the address $VA_4$ with a desired signature value $C_a(VA_4)$ determined on the basis of the address $VA_4$. If actual signature value $ISS_{ISSE}$ and desired signature value $C_a(VA_4)$ correspond, then the processor 2 ends operation in the secure mode as planned. If actual signature value $ISS_{ISSE}$ and desired signature value $C_a(VA_4)$ do not correspond, by contrast, then an error signal is set. In one variant, the signal is stored in a register. In a further variant of the exemplary embodiment, the processor 2 terminates the processing of the operating sequence.

Third Exemplary Embodiment of the Method According to Various Embodiments

The method in accordance with the third exemplary embodiment is based on an operating sequence of instructions (FIG. 5) of a third exemplary embodiment of a computer program according to various embodiments, which, as in the case of the method of the first exemplary embodiment and as in the case of the method of the second exemplary embodiment, is designed to run on the computer of the exemplary embodiment of the apparatus according to various embodiments. The operating sequence is designed for processing in a processor 2 and/or in a plurality of processors of the computer by instructions $i_1, \ldots, i_{11}, \ldots, i_{12}, \ldots, i_2, \ldots$ of the operating sequence being processed.

Figure 5:
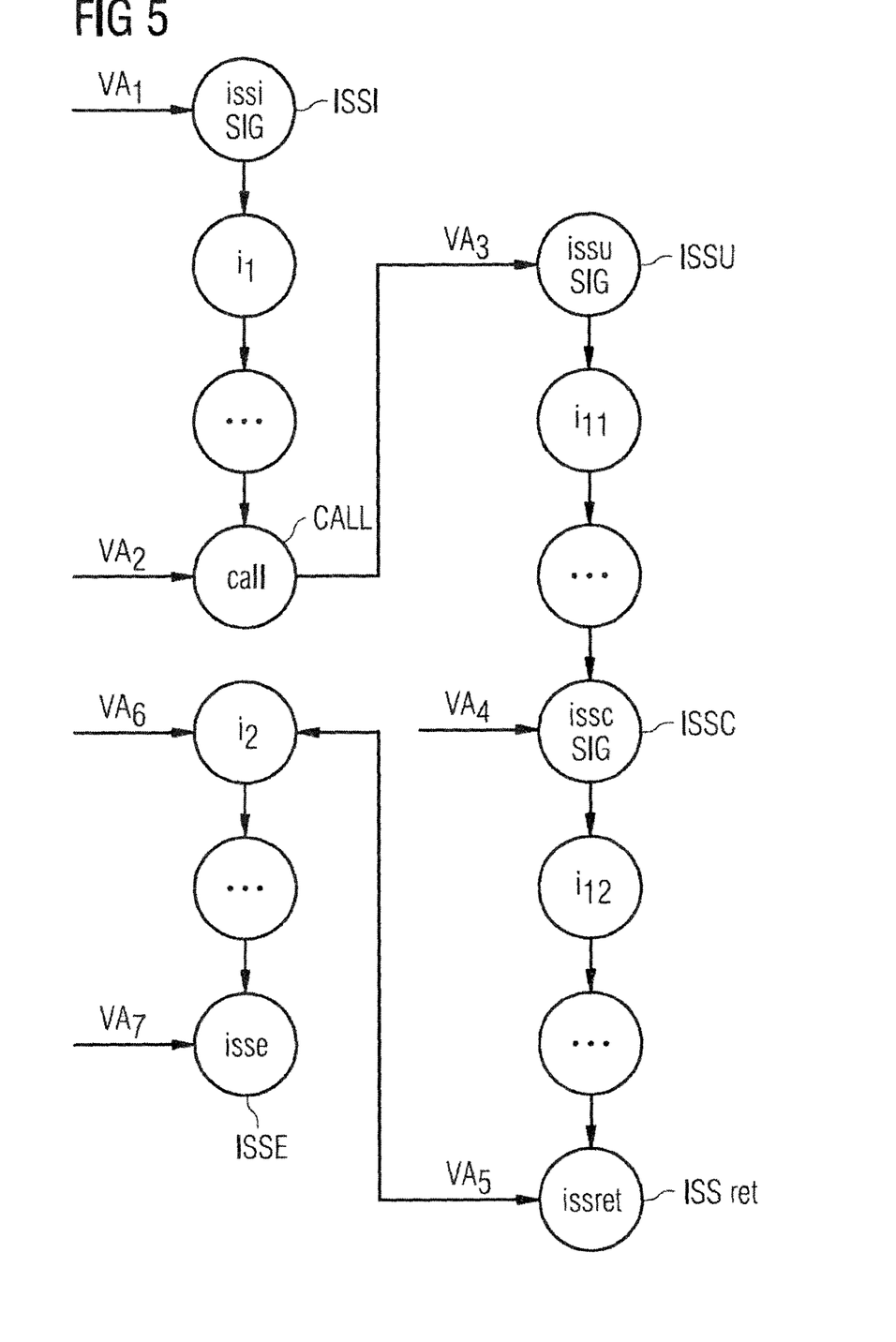
FIG. 5 shows a schematic illustration of a third exemplary embodiment of the method according to the disclosed embodiments.

The computer program of the third exemplary embodiment has a main program and a subroutine. The subroutine can be called by the main program. Accordingly, the operating sequence includes a main section having instructions $i_1, \ldots, i_2, \ldots$ and a sub-section having instructions $i_1, \ldots, i_{12}, \ldots$.

Specifically, the computer program of the third exemplary embodiment has a first signature instruction ISSI, which identically corresponds to the first signature instruction ISSI of the first exemplary embodiment and which is provided for execution before a first instruction $i_1$.

The computer program furthermore has a sixth signature instruction ISSE, which executes a sixth signature operation "end of a protected operating sequence" (Instruction Stream Signature Exit). The sixth signature instruction ISSE is stored in the memories 4 at the address $VA_7$ for execution after a last instruction of the main section of the operating sequence.

In the main program of the operating sequence, the computer program furthermore has a second signature instruction CALL, which is stored at the address $VA_6$ before a second instruction $i_2$ of the main section of the operating sequence.

Directly succeeding the instruction CALL, the operating sequence has a third signature instruction ISSU (update operating sequence register with predefined value). In the third exemplary embodiment, the third signature instruction ISSU marks an entry point into the subroutine of the computer program. The third signature instruction ISSU is followed by the instruction $i_{11}$ of the sub-section of the operating sequence.

Furthermore, the computer program has a fourth signature instruction ISSC (signature check), which is stored before a further instruction $i_{12}$ of the subroutine of the operating sequence.

The computer program has a fifth signature instruction ISSret (signature return), which is provided for execution after a last instruction of the subroutine of the operating sequence. In the sequence of the operating sequence, the instruction ISSret is followed by the second instruction $i_2$ at the address $VA_6$.

The sequence of the computer program of the third exemplary embodiment is described below.

Firstly, as in the first exemplary embodiment, the first signature instruction ISSI is executed and the processor 2 subsequently processes the first instructions $i_1, \ldots$ of the operating sequence, and in the meantime the signature device 153 determines assigned signature values $ISS_1, ISS \ldots$.

The second signature instruction CALL is then executed. The call operation includes storing the address $VA_6$ of the signature instruction as a return address in an address link register of the register file 16. Furthermore, the call operation includes calculating the signature value $ISS_{CALL}$ of the call operation. The value $ISS_{CALL}$ of the actual signature register is then written to a signature link register. An operation "initialize actual signature register with address" (Instruction Stream Signature Write Address, for short: ISSWA) is subsequently carried out, that is to say that a signature value $C_a(VA_3)$ is determined on the basis of the address $VA_3$ and is written to the actual signature register. An entry into the subroutine at the address $VA_3$ of the third signature instruction ISSU then takes place.

The sequence of the subroutine includes extracting the signature change value $m_{ISSU}$ of the signature field from the third signature instruction ISSU and reading the actual signature value $ISS_{ISSU}$. The actual signature register is then updated to an actual signature value $ISS_{VA3}$ taking account of the signature change value $m_{ISSU}$. The instructions $i_{11}, \ldots$ of the subroutine are then processed with the actual signature register being updated. In this case, a check can take place, such as is provided for example with the fourth signature instruction at the address $VA_4$.

The fifth signature instruction ISSret (signature return) at the address $VA_5$ includes an update of the actual signature register 154. The updated actual signature value $ISS_{ISSret}$ is then compared with the desired signature value $c_a(VA_5)$ for the address $VA_5$ of the fifth signature instruction ISSret. If actual signature value $ISS_{ISSret}$ and desired signature value $c_a(VA_5)$ do not correspond, then an error signal is set. If actual signature value $ISS_{ISSret}$ and desired signature value $c_a(VA_5)$ correspond, then the value $ISS_{CALL}$ of the signature link register in the register file 16 is written to the actual signature register 154, the address $VA_6$ is read from the address link register and the return to the main program at the second instruction $i_2$ at the address $VA_6$ is accomplished.

From the second instruction $i_2$ at the address $VA_6$, the processor 2 continues the processing of the operating sequence and processes the next instructions of the operating sequence whilst determining the respectively assigned signature value.

Finally, the sixth signature instruction ISSE carries out the end signature check in a manner such as has already been described with regard to the first and second exemplary embodiments.

While the disclosed embodiments has been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A method for processing an operating sequence of instructions of a program in a processor,
   wherein each instruction is represented by an assigned instruction code which comprises one execution step to be processed by the processor or a plurality of execution steps to be processed successively by the processor, comprising:
   determining an actual signature value assigned to a current execution step of the execution steps of the instruction code representing the instruction of the operating sequence;
   determining, in a manner dependent on an address value, a desired signature value assigned to the current execution step; and
   if the actual signature value does not correspond to the desired signature value, omitting at least one execution step directly available for execution and an execution step indirectly available for execution.

2. The method as claimed in claim 1, wherein the method comprises:
only if the actual signature value corresponds to the desired signature value, executing the execution step directly available for execution.

3. The method as claimed in claim 1, wherein the address value corresponds to an address of the current execution step and determining the desired signature value comprises:
ascertaining the address of the current execution step.

4. The method as claimed in claim 1, wherein the actual signature value is determined in a manner dependent on a signature change value.

5. The method as claimed in claim 1, wherein the method further comprises:
if the actual signature value does not correspond to the desired signature value, setting a signal according to which the processing of the operating sequence is to be interrupted, or a signal according to which the processing of the operating sequence is to be terminated.

6. The method as claimed in claim 1, wherein only a single desired signature value is determined for each instruction independently of a number of the execution steps of the instruction code representing the instruction.

7. The method as claimed in claim 1, wherein at most a single comparison of actual signature value with desired signature value is performed for each instruction independently of the number of the execution steps of the instruction code representing the instruction.

8. The method as claimed in claim 1, wherein the method further comprises:
checking whether the current instruction and the current execution step are qualified as a signature instruction and as a signature execution step, and
if the current instruction and the current execution step are qualified, carrying out the comparison of actual signature value with desired signature value.

9. The method as claimed in claim 1, wherein the method further comprises:
reading out instruction code which represents the current instruction from memories at an address identified by means of the address value.

10. The method as claimed in claim 1, wherein the actual signature value is determined by a mapping by means of an operating sequence signature function.

11. The method as claimed in claim 10, wherein the mapping takes account of an actual signature value already determined.

12. The method as claimed in claim 1, wherein the operating sequence has a sub-operating sequence, the method further comprising:
reading the actual signature value from an actual signature register;
writing the actual signature value to a first signature value memory address,
executing the sub-operating sequence, and
reading the value at the first signature value memory address and writing the read-out value to the actual signature register.

13. The method as claimed in claim 12, wherein the sub-operating sequence is assigned a sub-operating sequence signature change value and a first actual signature value of the sub-operating sequence is determined only in a manner dependent on this sub-operating sequence signature change value.

14. The method as claimed in claim 1, wherein the method further comprises:
changing a mode signal which signals a first sequence mode in such a way that the mode signal signals a second sequence mode;
executing the sub-operating sequence; and
changing the mode signal which signals the second sequence mode in such a way that the mode signal signals the first sequence mode.

15. The method as claimed in claim 14, further comprising:
writing the actual signature value to a second signature value memory address if the mode signal which signals the first sequence mode is changed in such a way that the mode signal signals the second sequence mode; and
reading the value at the second signature value memory address and writing the read-out value to the actual signature register if the mode signal which signals the second sequence mode is changed in such a way that the mode signal signals the first sequence mode.

16. The method as claimed in claim 14, wherein an actual signature value is determined either only if the first sequence mode is signaled, or only if the second sequence mode is signaled.

17. A computer program, designed for carrying out a method for processing an operating sequence of instructions of a program in a processor,
wherein each instruction is represented by an assigned instruction code which comprises one execution step to be processed by the processor or a plurality of execution steps to be processed successively by the processor, comprising:
determining an actual signature value assigned to a current execution step of the execution steps of the instruction code representing the instruction of the operating sequence:
determining, in a manner dependent on an address value, a desired signature value assigned to the current execution step; and
if the actual signature value does not correspond to the desired signature value, omitting at least one execution step directly available for execution and an execution step indirectly available for execution.

18. A method for providing an instruction code representing one or a plurality of instructions of an operating sequence of a computer program which is provided for being carried out in a processor, wherein the instruction code representing a respective instruction comprises one execution step to be executed by the processor or a plurality of execution steps to be executed successively by the processor, comprising:
translating a program text representing the operating sequence into the instruction code;
defining an inception execution step assigned to the operating sequence in the instruction code; and
allocating a signature change value to the inception execution step.

19. The method as claimed in claim 18, wherein the method further comprises:
writing a path signal value, representing a predefined path, into a signature field of the instruction code; and
writing a signature change value, representing a signature change, into the signature field.

20. The method as claimed in claim 18, wherein the method further comprises:
adding instruction code representing a signature instruction, after which the actual signature value is checked for correspondence to the desired signature value.

21. A compiler product,
designed for creating a computer program,
by compiling a program text representing the operating sequence in order to provide the instruction code representing the operating sequence,
and furthermore designed to define an inception execution step assigned to the operating sequence and to allocate a signature change value to the inception execution step, said computer program being designed for carrying out a method for processing an operating sequence of instructions of a program in a processor,
wherein each instruction is represented by an assigned instruction code which comprises one execution step to be processed by the processor or a plurality of execution steps to be processed successively by the processor, comprising:
  determining an actual signature value assigned to a current execution step of the execution steps of the instruction code representing the instruction of the operating sequence;
  determining, in a manner dependent on an address value, a desired signature value assigned to the current execution step; and
  if the actual signature value does not correspond to the desired signature value, omitting at least one execution step directly available for execution and an execution step indirectly available for execution.

22. The compiler product as claimed in claim 21, wherein the compiler product is designed to determine the signature change value in a manner dependent on the predefined desired signature value.

23. The compiler product as claimed in claim 22, wherein the compiler product is designed to determine the signature change value by tracing a program sequence path, wherein the program sequence path begins with the inception execution step and ends with the execution step which is written to the memory at the address to which the signature instruction or the signature execution step is assigned.

24. The compiler product as claimed in claim 23, wherein the signature change value is determined proceeding from the address to which the signature instruction or signature execution step is assigned, with inverse application of a mapping function which is applied during the sequence of the program in accordance with a predefined rule.

25. A circuit, comprising; an actual signature register, which is designed for receiving an actual signature value from a signature device, a desired signature register, which is designed for receiving a desired signature value, and a comparison device having a signal output section, said comparison device being designed for signaling a result of the comparison of the actual signature value in the actual signature register with the desired signature value in the desired signature register at the signal output section.

26. The circuit as claimed in claim 25, wherein the desired signature register is designed in such a way that a value in the desired signature register is derived from an address at which is stored an instruction according to which the actual signature value is compared with the desired signature value.

27. The circuit as claimed in claim 25, wherein the desired signature register is embodied as an address value register having the address value of the instruction.

28. The circuit as claimed in claim 25, designed for carrying out a method for processing an operating sequence of instructions of a program in a processor,
wherein each instruction is represented by an assigned instruction code which comprises one execution step to be processed by the processor or a plurality of execution steps to be processed successively by the processor, comprising:
  determining an actual signature value assigned to a current execution step of the execution steps of the instruction code representing the instruction of the operating sequence;
  determining, in a manner dependent on an address value, a desired signature value assigned to the current execution step; and
  if the actual signature value does not correspond to the desired signature value, omitting at least one execution step directly available for execution and an execution step indirectly available for execution.

29. The circuit as claimed in claim 25, wherein the circuit is embodied in a deactivatable manner in such a way that the actual signature register receives no value from the signature device if the circuit is deactivated.

* * * * *

UNITED STATES PATENT AND TRADEMARK OFFICE
CERTIFICATE OF CORRECTION

PATENT NO. : 9,003,198 B2  
APPLICATION NO. : 13/899655  
DATED : April 7, 2015  
INVENTOR(S) : Gammel et al.

Page 1 of 1

It is certified that error appears in the above-identified patent and that said Letters Patent is hereby corrected as shown below:

On the title page item [72] delete "Stefan MANGARD, Munich (DE)" and replace with --Stefan MANGARD, Graz (AT)--.

Signed and Sealed this  
Tenth Day of May, 2016

Michelle K. Lee  
*Director of the United States Patent and Trademark Office*